US011679900B2

(12) United States Patent
Budd

(10) Patent No.: US 11,679,900 B2
(45) Date of Patent: Jun. 20, 2023

(54) SYSTEM AND METHOD FOR CARRYING AN AERONAUTICAL OR LAUNCH VEHICLE TO ALTITUDE FOR RELEASE TO FLIGHT

(71) Applicant: Sky Launch Corporation, Lancaster, CA (US)

(72) Inventor: Gerald D. Budd, Lancaster, CA (US)

(73) Assignee: Sky Launch Corporation, Lancaster, CA (US)

( * ) Notice: Subject to any disclaimer, the term of this patent is extended or adjusted under 35 U.S.C. 154(b) by 0 days.

(21) Appl. No.: 17/460,186

(22) Filed: Aug. 28, 2021

(65) Prior Publication Data

US 2022/0089298 A1 Mar. 24, 2022

Related U.S. Application Data

(60) Provisional application No. 63/081,262, filed on Sep. 21, 2020.

(51) Int. Cl.
*B64G 1/00* (2006.01)
*B64D 1/12* (2006.01)

(52) U.S. Cl.
CPC .............. *B64G 1/005* (2013.01); *B64D 1/12* (2013.01)

(58) Field of Classification Search
CPC ............. B64G 1/005; B64D 1/12; B64D 5/00
See application file for complete search history.

(56) References Cited

U.S. PATENT DOCUMENTS

| 2,921,501 | A | * | 1/1960 | Jean | ..................... B64D 1/04 89/1.51 |
|---|---|---|---|---|---|
| 5,626,310 | A | | 5/1997 | Kelly | |
| 7,458,544 | B1 | * | 12/2008 | Sarigul-Klijn | ........... B64D 1/12 244/137.4 |
| 8,727,264 | B1 | | 5/2014 | Rutan | |
| 9,944,410 | B1 | | 4/2018 | Budd | |
| 11,117,667 | B1 | * | 9/2021 | McGann | ................... B64C 7/00 |
| 2003/0080241 | A1 | | 5/2003 | Shpigler et al. | |
| 2011/0240799 | A1 | * | 10/2011 | McMahon | ............... B64D 1/06 244/137.4 |
| 2015/0021428 | A1 | | 1/2015 | Rutan | |

FOREIGN PATENT DOCUMENTS

EP     2279945 B1    1/2015

\* cited by examiner

*Primary Examiner* — Valentina Xavier
(74) *Attorney, Agent, or Firm* — Lance M. Pritikin

(57) ABSTRACT

Disclosed are systems and methods for carrying an aeronautical or launch vehicle to altitude for release to independent flight. The system may comprise one or more mounting elements affixed to a carrier aircraft along a mounting axis and actuatable from a retention configuration to a release configuration. The retention configuration enables the mounting elements to secure the vehicle to the carrier aircraft. Actuation from retention configuration to release configuration releases the vehicle from the carrier aircraft. A detent element is configured to restrict movement of the vehicle rotationally about, and axially along, a roll axis of the vehicle with respect to the carrier aircraft when the vehicle is secured to the carrier aircraft. The system may include an adaptor beam to which each mounting element is fastened, and by which the affixing is achieved. The retention configuration may enable the mounting elements to secure the vehicle beneath the carrier aircraft.

20 Claims, 9 Drawing Sheets

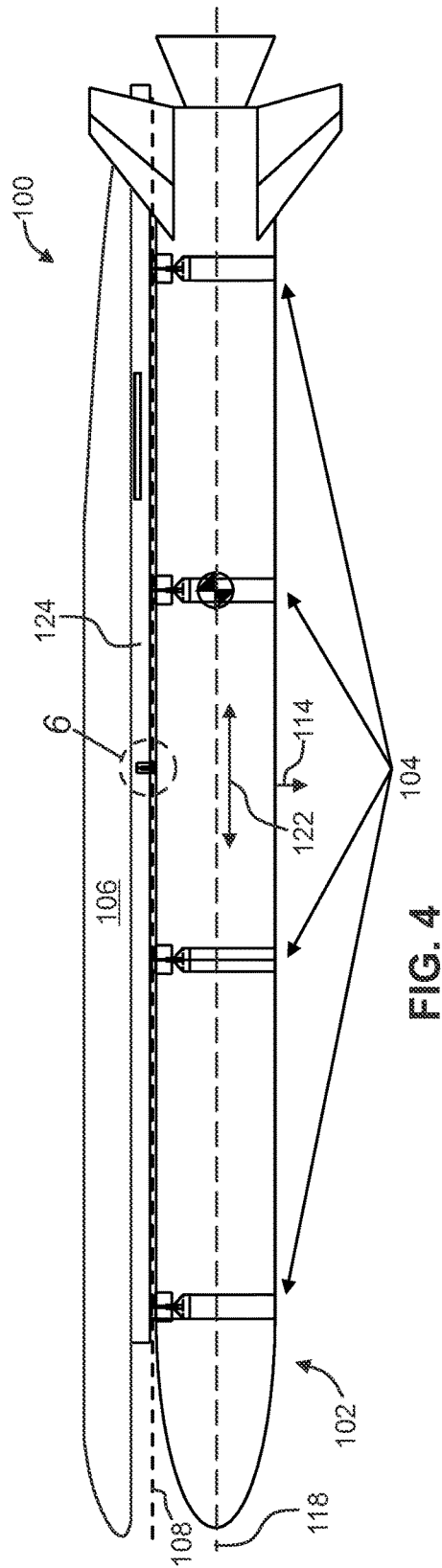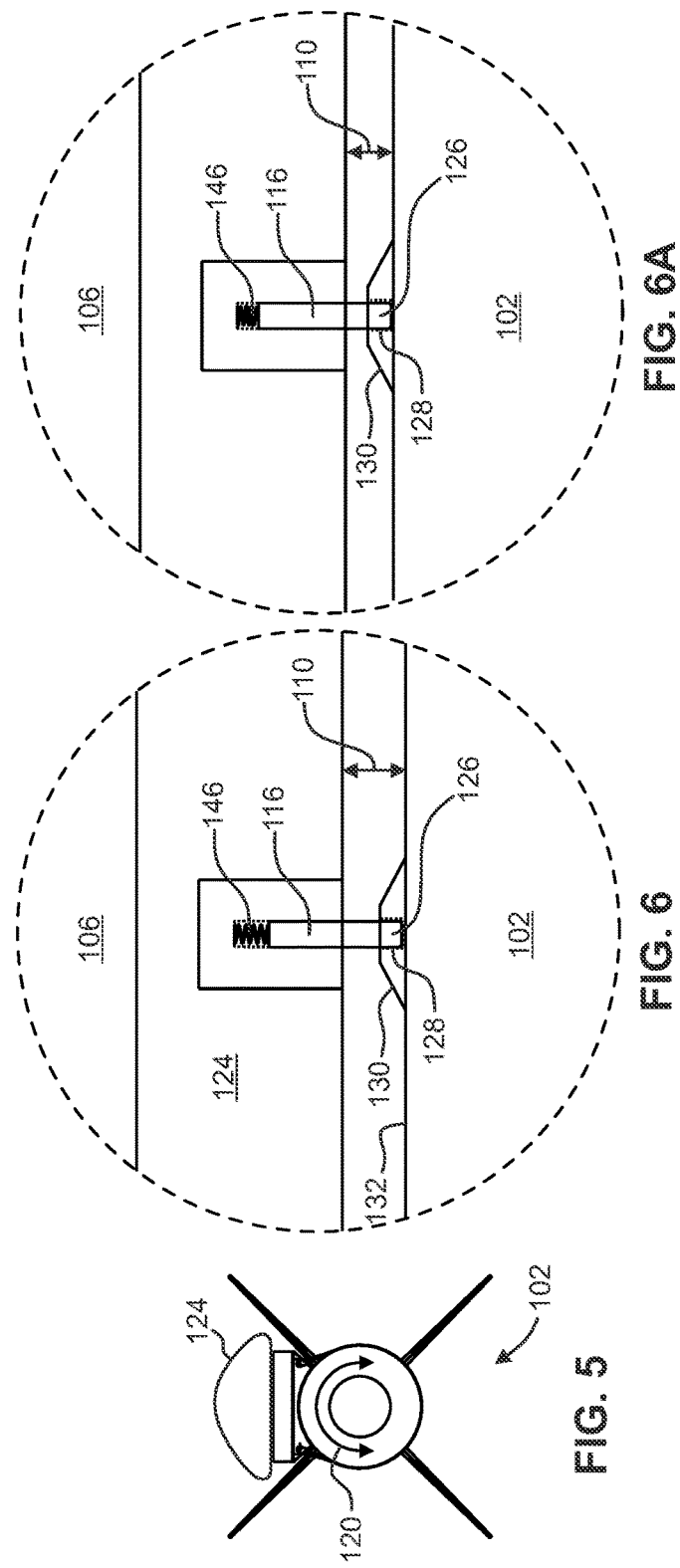

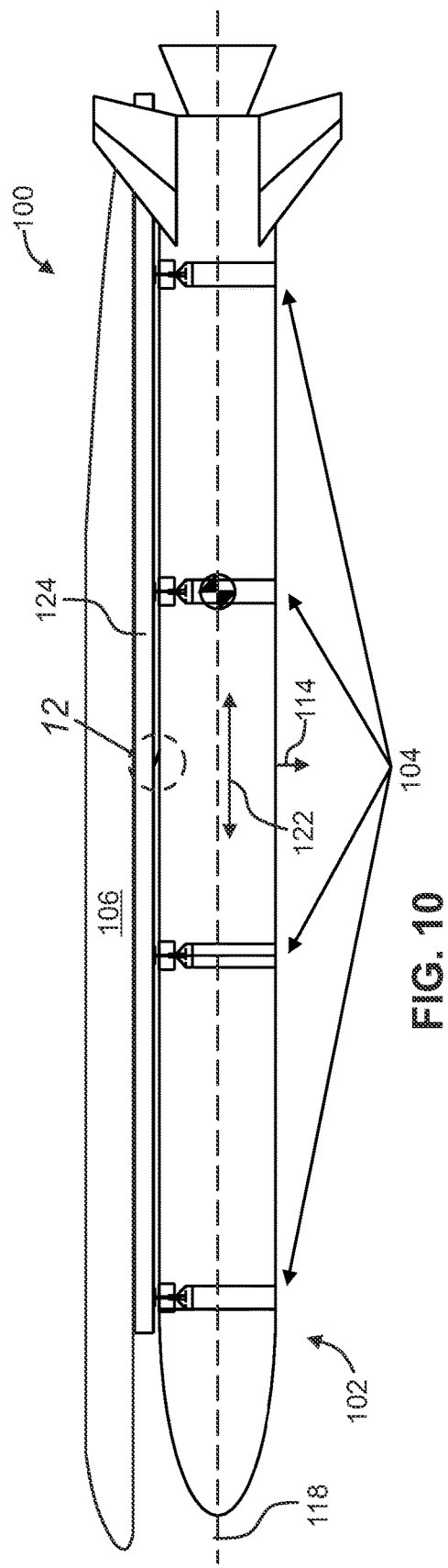
FIG. 10
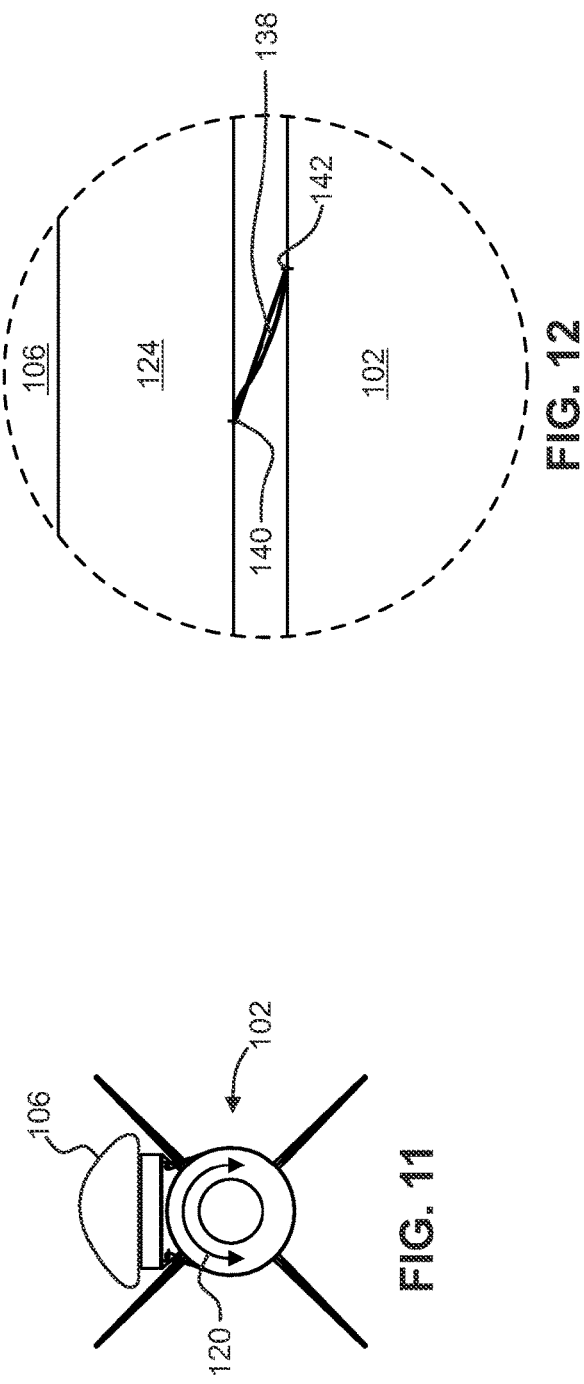
FIG. 12
FIG. 11

SYSTEM AND METHOD FOR CARRYING AN AERONAUTICAL OR LAUNCH VEHICLE TO ALTITUDE FOR RELEASE TO FLIGHT

RELATED APPLICATIONS

This application claims the benefit of U.S. Provisional Application No. 63/081,262 filed Sep. 21, 2020, the contents of which are incorporated by this reference in their entireties for all purposes as if fully set forth herein.

TECHNICAL FIELD

The disclosure herein relates generally to systems and methods for carrying aeronautical or launch vehicles to high altitudes from which they can commence independent powered flight.

BACKGROUND

Aerospace vehicles have been carried to altitude for release from other aircraft for many years. In the late 1940's piloted, experimental research aircraft (X-Planes) were carried aloft underneath modified military bomber aircraft (B-29, B-52) by NASA and the Air Force to perform aeronautical flight research experiments. Later, remotely piloted and autonomous vehicles would be carried aloft and released for flight. In all of these examples, the aeronautical vehicle was carried horizontally underneath the carrier aircraft and attached via a releasable, mechanical system, usually a metallic hook and pin arrangement, to hold the aeronautical vehicle captive until it was ready for release at altitude.

In the case of an aeronautical research vehicle, the research vehicle is generally intended to be flown and operated multiple times. These vehicles are designed to operate and maneuver in the atmosphere with sufficient structural margins to allow for robust operation and minimal inspection between flights. For these vehicles, the hook and pin mechanical attachment method worked well as the aeronautical research vehicle wasn't generally optimized for the lightest possible weight. In contrast, launch vehicles are designed to be as light weight as possible to maximize the vehicles performance in placing a satellite into orbit. However, these vehicles are designed to be launched vertically from a ground facility, not horizontally from a carrier aircraft. Carrying the launch vehicle horizontally to altitude subjects it to structural bending loads the vehicle wasn't designed for when launching vertically from a fixed location, ground launch pad. Adding additional structure to the launch vehicle to allow it to be carried horizontally using traditional mechanical attachment methods would add undesirable weight to the launch vehicle and adversely reduce the launch vehicles payload performance to orbit. The problem is especially prevalent when the launch vehicle is mounted under the wing of the carrier aircraft.

Often, the only practical attachment location of the launch vehicle to the carrier aircraft is at the intersection location of the wing with the launch vehicle. This constraint may force the mechanical attachments to be concentrated to the area localized around the aeronautical vehicles Center of Gravity (CG). As most aeronautical vehicles are long and slender, such attachment configuration imposes additional structural bending loads on the captive vehicle due to the cantilevering of the vehicles mass in front of and behind the vehicles Center of Gravity (See, for example, FIG. 1). Additional mechanical structure may have to be added to the launch vehicle to resolve these loads, which may result in an increase in structural mass (and less payload to orbit). Additionally, the loads are not static in nature, as the carrier aircraft must pull G's to turn and maneuver while airborne.

Carrying an aeronautical or launch vehicle under a hull of a carrier aircraft to release altitude by way of releasable slings or straps may conventionally allow the vehicle to undesirably shift around or along the roll axis of the vehicle. What is needed are expedients for limiting or preventing the vehicle from moving rotationally about and axially along the roll axis of the vehicle with respect to the carrier aircraft when the vehicle is secured to the carrier aircraft.

SUMMARY

One or more deficiencies of the prior art are solved by way of embodiments of an adaptable, flexible system and method for attaching lightweight launch vehicles to a carrier aircraft to facilitate launch initiation at high altitude with minimal structural modification to the launch vehicle, in accordance with the present disclosure.

A launch/aerospace vehicle can be restricted in movement while attached to the carrier aircraft in flight by several methods. In one example implementation, a spring-loaded pin can project from an adaptor beam attached to the carrier aircraft and into a hole in a receptacle plate mounted on the external mold line of the launch/aerospace vehicle, thereby limiting motion of the vehicle both axially and rotationally with respect to the carrier aircraft. Upon release from the mounting system, the launch/aerospace vehicle may fall away from the carrier aircraft, thereby removing the spring-loaded pin from the receptacle plate, and allowing unrestricted movement of the launch/aerospace vehicle.

In a further example implementation, a spring-loaded pin can project from the adaptor beam into a hole on the inside of the outer skin of the launch/aerospace vehicle, thereby limiting the motion of the vehicle both axially and rotationally with respect to the carrier aircraft. Upon release from the mounting system, the launch/aerospace vehicle may fall away from the carrier aircraft, thereby removing the spring-loaded pin from the hole on the inside of the outer skin of the launch/aerospace vehicle, and allowing unrestricted movement of the launch/aerospace vehicle.

In another example implementation, a short lanyard can connect the adaptor beam or part of the mounting element to the launch/aerospace vehicle, thereby limiting motion of the vehicle both axially and rotationally with respect to the carrier aircraft. Upon release from the mounting elements, an explosive bolt can be used to disconnect the lanyard from the launch/aerospace vehicle.

In yet another example implementation, a "stop block" can be utilized at the aft end of the launch/aerospace vehicle that can fit into a slot in an indexing bracket to limit movement both aft and in rotation about the longitudinal body axis of the launch/aerospace vehicle. Upon release from the mounting system, the launch/aerospace vehicle may fall away from the carrier aircraft, thereby removing the stop block from the indexing bracket, and allowing unrestricted movement of the launch/aerospace vehicle.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 4 is a diagrammatic side view of a first example system for carrying an aeronautical or launch vehicle to altitude for release to flight in accordance with the present disclosure, wherein the detent element is a spring-loaded pin resiliently biased to protrude from an adaptor beam;

FIG. 5 is a diagrammatic rear view of the example system of FIG. 4;

FIG. 6 is a magnified view of detail 6 in FIG. 4, showing an engagement portion of the detent element being received by a detent receptacle provided in a receptacle plate on the vehicle;

FIG. 6A is a magnified view similar to that of FIG. 6, but wherein the vehicle has moved closer to the carrier aircraft, reducing the distance therebetween and causing the detent element to partially retract against the force of the detent spring;

FIG. 10 is a diagrammatic side view of a third example system for carrying an aeronautical or launch vehicle to altitude for release to flight in accordance with the present disclosure, wherein the detent element is a vehicle lanyard;

FIG. 11 is a diagrammatic rear view of the example system of FIG. 10;

FIG. 12 is a magnified view of detail 12 in FIG. 10, showing the vehicle lanyard connected to the vehicle and an adaptor beam;

DETAILED DESCRIPTION OF THE PREFERRED EMBODIMENTS

Figure 1:
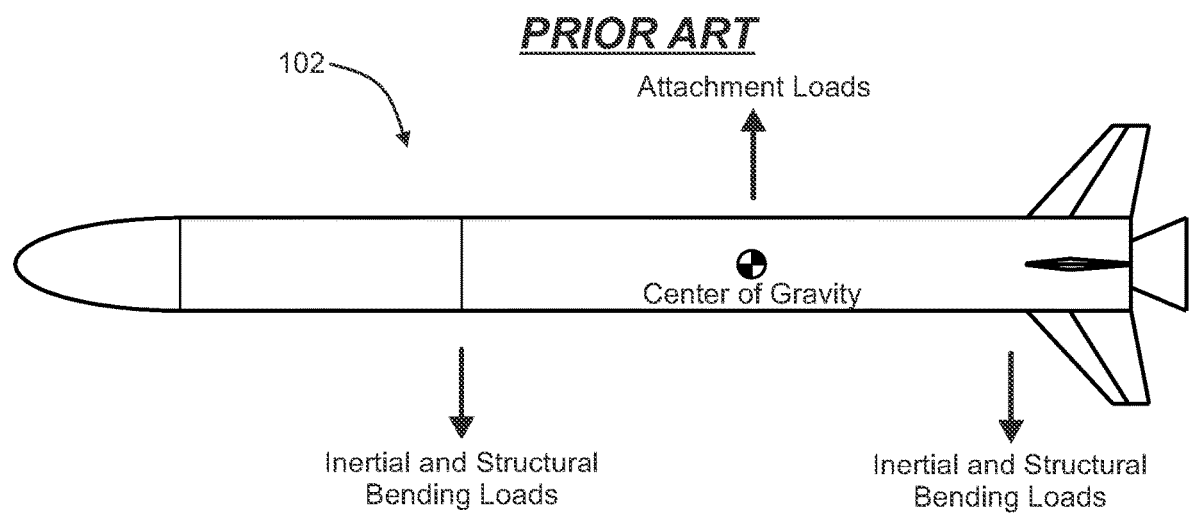
FIG. 1 is a diagrammatic side view illustrating one example conventional aeronautical or launch vehicle, and the loads imposed on that vehicle by certain conventional attachment means.

Referring now to the drawings, like reference numerals designate identical or corresponding features throughout the several views.

Figure 2:
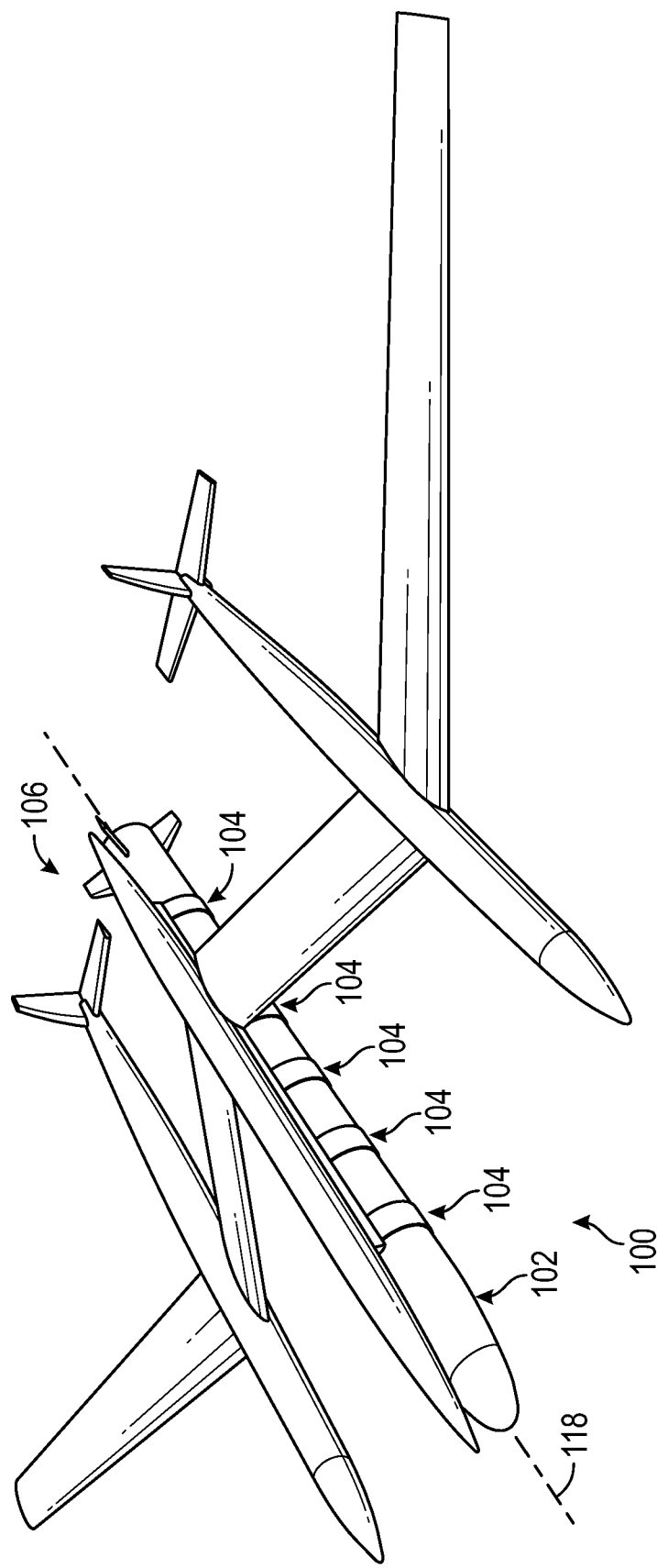
FIG. 2 is a diagrammatic perspective view of one example of a system for carrying an aeronautical or launch vehicle to altitude for release to flight, in accordance with the present disclosure.
Figure 3:
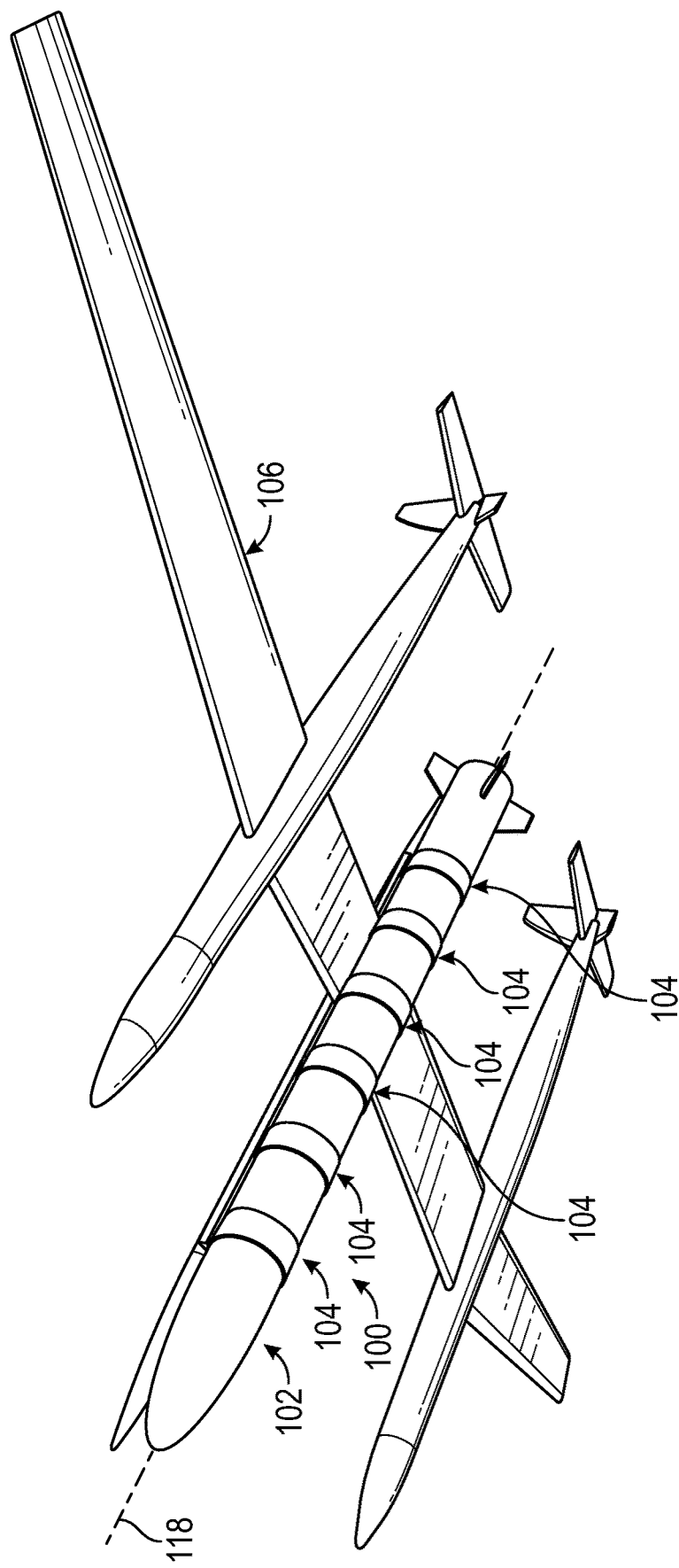
FIG. 3 is another diagrammatic perspective view of an example of a system for carrying an aeronautical or launch vehicle to altitude for release to flight, in accordance with the present disclosure.
Figure 7:
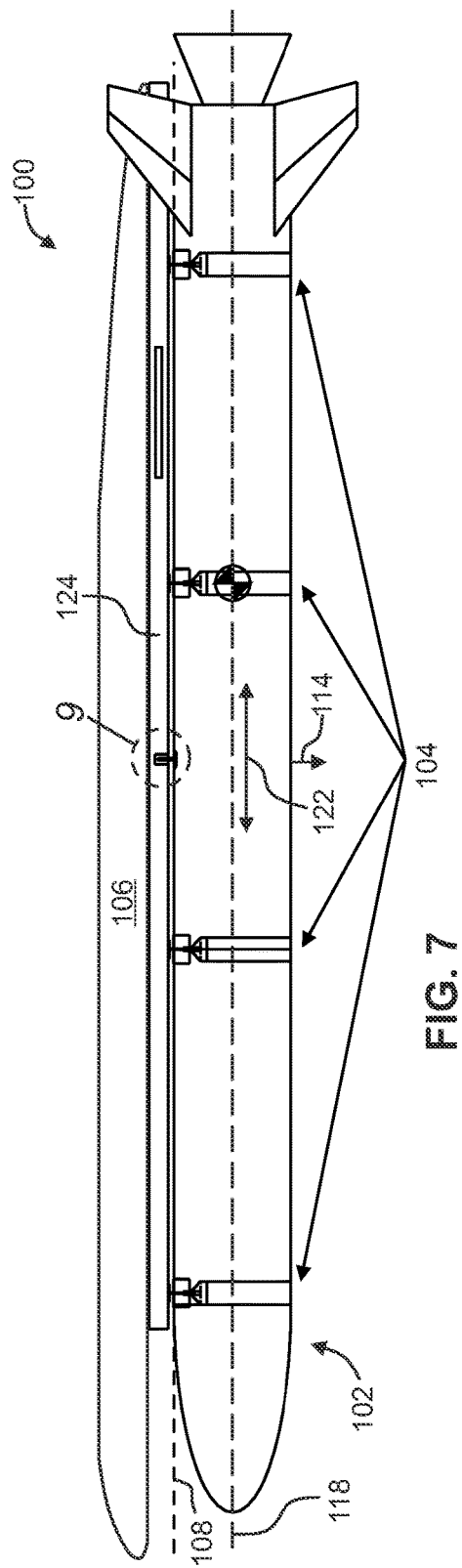
FIG. 7 is a diagrammatic side view of a second example system for carrying an aeronautical or launch vehicle to altitude for release to flight in accordance with the present disclosure, wherein the detent receptacle is disposed within the external mold line of the vehicle.
Figure 9:
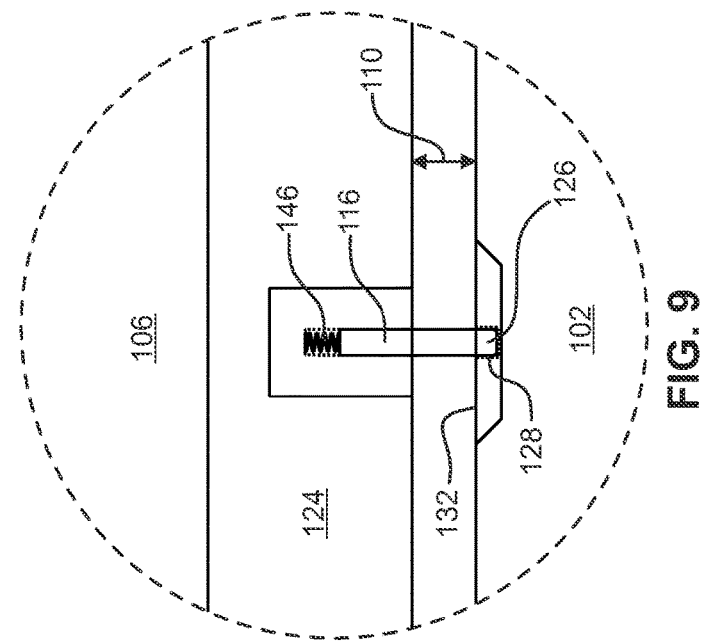
FIG. 9 is a magnified view of detail 9 in FIG. 7, showing an engagement portion of the detent element being received by a detent receptacle provided in a receptacle plate on the vehicle.
Figure 8:
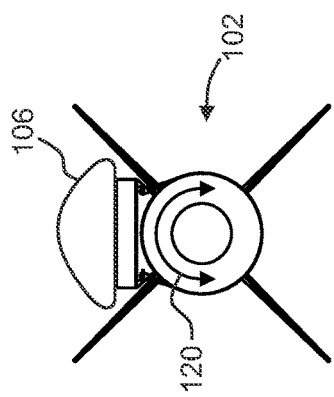
FIG. 8 is a diagrammatic rear view of the example system of FIG. 7.
Figure 13:
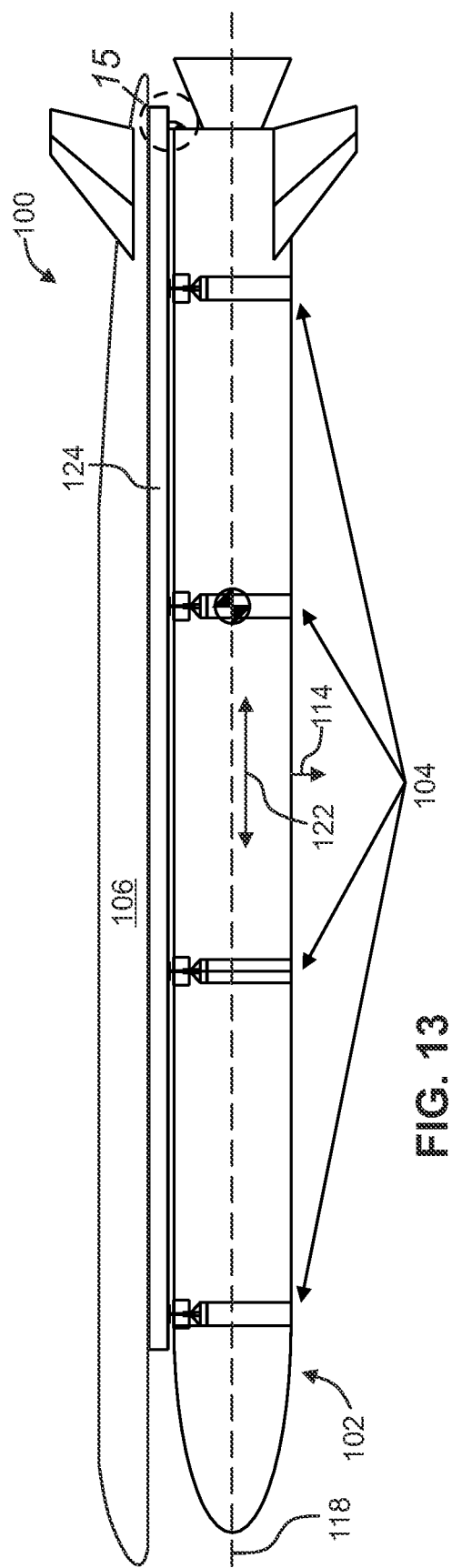
FIG. 13 is a diagrammatic side view of a fourth example system for carrying an aeronautical or launch vehicle to altitude for release to flight in accordance with the present disclosure, wherein the detent element is an indexing bracket on an aft end of the vehicle configured to engage a stop block element on the adaptor plate.
Figure 16:
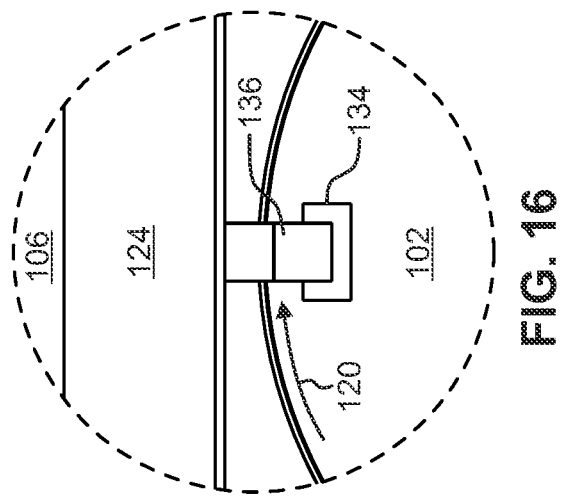
FIG. 16 is a magnified view of detail 16 in FIG. 14.
Figure 15:
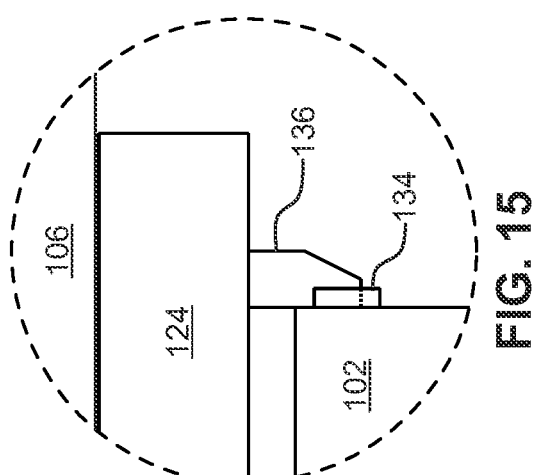
FIG. 15 is a magnified view of detail 15 in FIG. 13, showing the indexing bracket engaging the stop block element of the adaptor beam.
Figure 14:
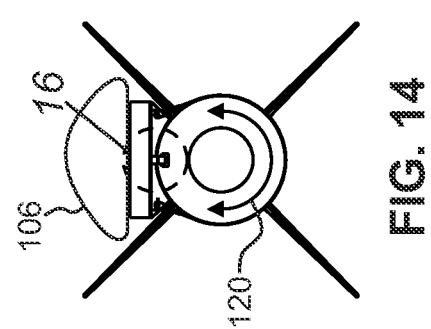
FIG. 14 is a diagrammatic rear view of the example system of FIG. 13.
Figure 17:
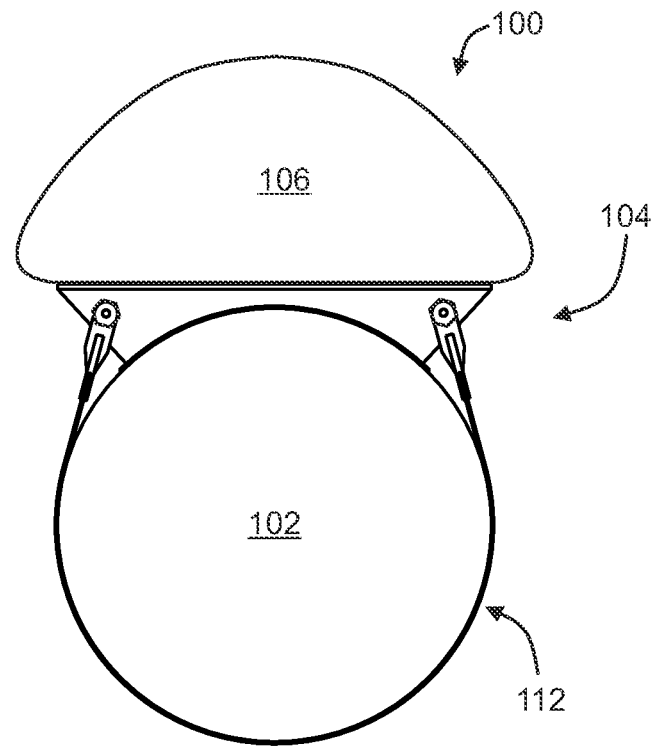
FIG. 17 is a diagrammatic front view of an example system in accordance with the present disclosure, showing the one or more mounting elements affixed to a carrier aircraft and being in the retention configuration with the mounting elements to securing the vehicle to the carrier aircraft.
Figure 18:
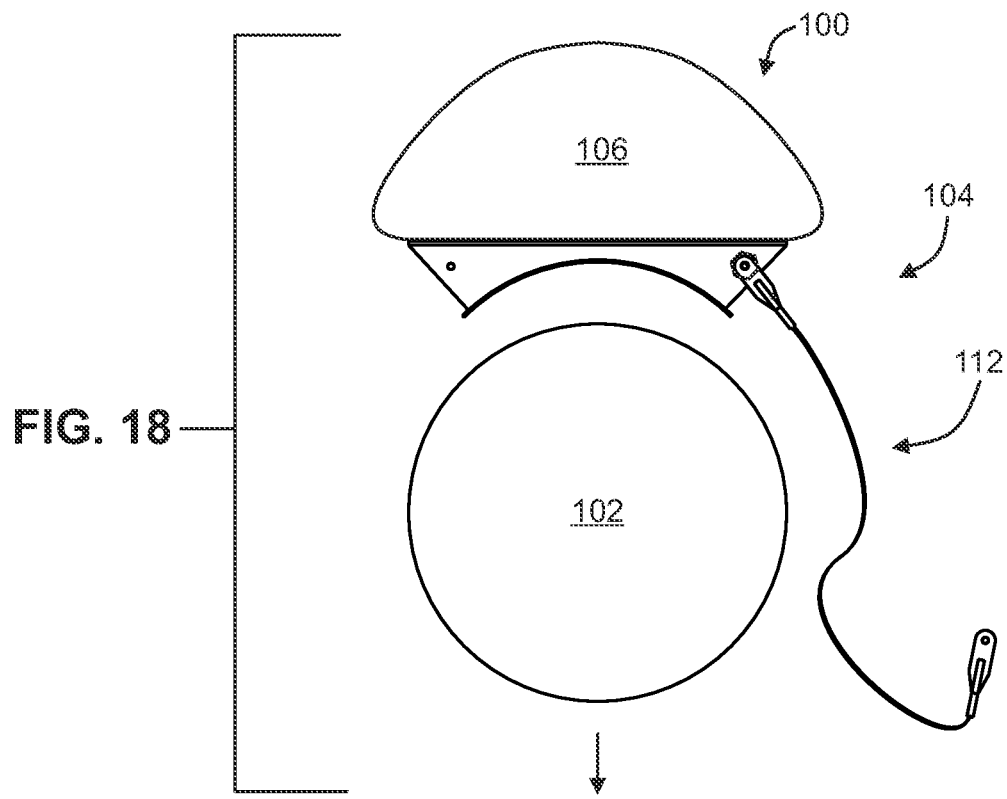
FIG. 18 is a diagrammatic front view of the example system of FIG. 17, but wherein the mounting elements have been activated to the release configuration to release the vehicle to drop away from the carrier aircraft.

With reference to the several drawings, embodiments of a system for carrying an aeronautical or launch vehicle to altitude for release to flight are shown generally at 100. Referring in particular to FIGS. 2-4, the system 100 may comprise one or more mounting elements 104 configured to be affixed to a carrier aircraft 106 (e.g., in distributed fashion) along a mounting axis 108. The mounting elements 104 may be actuatable from a retention configuration to a release configuration. Referring to FIG. 17, the retention configuration enables the one or more mounting elements 104 to secure the vehicle 102 to the carrier aircraft 106. Referring to FIG. 18, the actuation from the retention configuration to the release configuration releases the vehicle 102 from the carrier aircraft 106, at which point the vehicle 102 may depart from the carrier aircraft 106 by way of, for example, gravity, aerodynamic or thruster control subsystem, or some combination thereof. The retention configuration may preferably enable the one or more mounting elements 104 to secure the vehicle 102 beneath the carrier aircraft 106, which may allow the mounting elements 104 to collectively bear most or all of the weight 114 of the vehicle 102.

Referring to FIGS. 4-16, a detent element (116, 134, or 138) may be configured to restrict movement of the vehicle 102 rotationally (120) about and axially along (122) a roll axis 118 of the vehicle 102 with respect to the carrier aircraft 106 when the vehicle 102 is secured to the carrier aircraft 106.

Referring to FIGS. 4, 7, 10 and 13, the system 100 may further comprise an adaptor beam 124 to which each mounting element 104 is fastened and by which the affixing of the one or more mounting elements 104 to the carrier aircraft 106 is achieved. The adaptor beam 124 may be configured to be mated to the carrier aircraft 106 by way of a military store adaptor, such as a conventional MAU-12 ejector rack, or the like.

Referring to FIGS. 4-9, in particular implementations of the system 100, the detent element 116 may protrude from the adaptor beam 124 (or directly from the carrier aircraft 106) and have an engagement portion 126 configured to be received by a detent receptacle 128 in the vehicle 102. The detent element 116 may preferably be a spring-loaded pin resiliently biased (e.g., by way of a detent spring 146) to protrude from the adaptor beam 124 (or directly from the carrier aircraft 106). Referring to FIGS. 6 and 6A, such a spring-loaded configuration allows the detent element 116 to remain engaged with the corresponding detent receptacle 128 even as the distance 110 between the vehicle 102 and the carrier aircraft 106 fluctuates while in flight, while preventing the detent element 116 from imposing deformative forces on the vehicle 102. Preferably, the pin of the detent element 116 remains with the carrier aircraft 106 (or the adaptor plate 124, if applicable) after the vehicle 102 has been released from securement with the carrier aircraft 106. Referring to FIGS. 4-6A, the detent receptacle 128 may be provided in a receptacle plate 130. The receptacle plate 130 may be disposed on an external mold line 132 of the vehicle 102.

Referring to FIG. 13-16, the detent element may be an indexing bracket 134 on an aft end of the vehicle 102 configured to engage a stop block element 136 on the adaptor beam 124 (or directly on the carrier aircraft 106).

Referring to FIG. 10-12, the detent element is a vehicle lanyard, the vehicle lanyard having a first vehicle lanyard end connected to the vehicle and a second vehicle lanyard end connected to the adaptor beam or a said mounting element.

Figure 19:
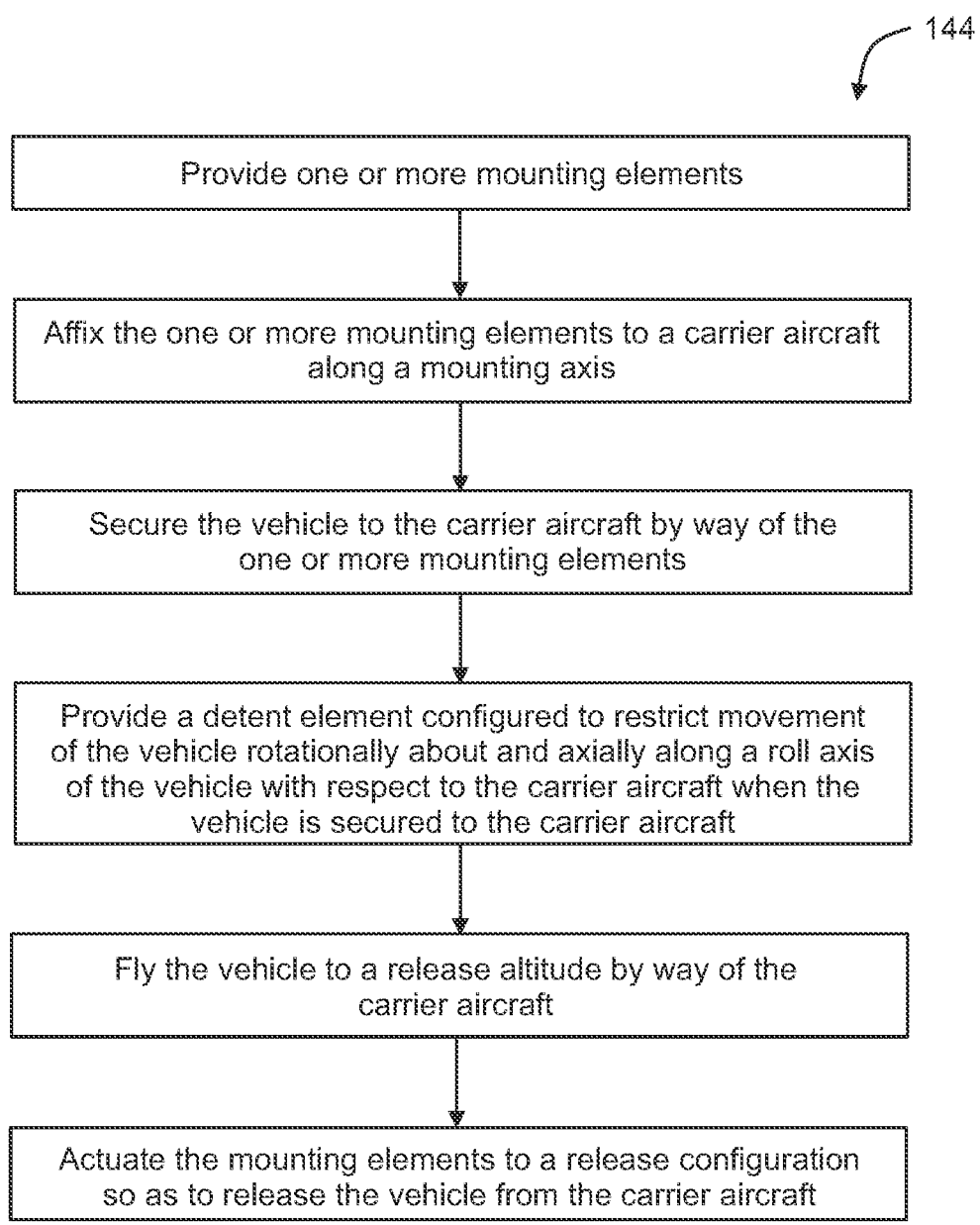
FIG. 19 is a diagrammatic flow chart of one example method for carrying an aeronautical or launch vehicle to altitude for release to flight in accordance with the present disclosure.

Referring to FIG. 19, a method for carrying an aerospace or launch vehicle to altitude for release to flight is illustrated at 144. Referring to the respective figures, one or more mounting elements 104 are provided. The one or more mounting elements 104 are affixed to a carrier aircraft 106 along a mounting axis 108. The vehicle 102 is secured to the carrier aircraft 106 by way of the one or more mounting elements 104. A detent element 116 (or 134 or 138) is provided which is configured to restrict movement of the vehicle 102 rotationally about and axially along a roll axis 118 of the vehicle 102 with respect to the carrier aircraft 106 when the vehicle 102 is secured to the carrier aircraft 106. The vehicle 102 is then flown to a release altitude (typically tens of thousands of feet above sea level) by way of the carrier aircraft 106. The mounting elements 104 are then actuated to a release configuration so as to release the vehicle 102 from the carrier aircraft 106.

Certain implementations of a method 144 may further comprise attaching an adaptor beam 124 to the carrier aircraft 106, wherein each mounting element 104 is fastened to the adaptor beam 124 and the affixing of the one or more mounting elements 104 to the carrier aircraft 106 is achieved by way of the adaptor beam 124.

In particular implementations of a method 144, the detent element 116 may protrude from the adaptor beam 124 and has an engagement portion 126 configured to be received by a detent receptacle 128 in the vehicle 102. The detent element 116 may be a spring-loaded pin resiliently biased (e.g., by way of a detent spring 146) to protrude from the adaptor beam. The detent receptacle 128 may be provided in a receptacle plate 130. The receptacle plate 130 may be disposed on an external mold line 132 of the vehicle 102.

In certain implementations of a method 144, the detent element is an indexing bracket 134 on an aft end of the vehicle 102 configured to engage a stop block element 136 on the adaptor beam 124.

In particular implementations of a method 144, the detent element may be a vehicle lanyard 138. The vehicle lanyard 138 may have a first vehicle lanyard end 140 connected to the vehicle 102 and a second vehicle lanyard end 142 connected to the adaptor beam 124 or a mounting element 104.

As would be readily apparent to a person of ordinary skill in the relevant field having the benefit of this disclosure, the systems and methods described herein may involve alignment of the mounting axis 108 under any portion of the carrier aircraft 106, including directly under the fuselage of the carrier aircraft 106, or under the wing of the carrier aircraft 106.

The following listing matches certain terminology used within this disclosure with corresponding reference numbers used in the non-limiting embodiments illustrated in the several figures.

100 system
102 vehicle
104 mounting element
106 carrier aircraft
108 mounting axis
110 distance (between vehicle and carrier aircraft or adaptor beam)
112 retention strap
114 weight (weight direction)
116 vehicle detent element (e.g., pin-type; e.g., spring-loaded pin)
118 roll axis (of vehicle)
120 rotational movement (about roll axis)
122 axial movement (along roll axis)
124 adaptor beam
126 engagement portion (of vehicle detent element)
128 detent receptacle (of vehicle; e.g., in a receptacle plate)
130 receptacle plate (e.g., providing the detent receptacle)
132 external mold line (of vehicle)
134 detent element (indexing bracket type)
136 stop block element
138 detent element (vehicle lanyard type)
140 first vehicle lanyard end (of vehicle lanyard)
142 second vehicle lanyard end (of vehicle lanyard)
144 method
146 detent spring While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for carrying an aeronautical or launch vehicle to altitude for release to flight, the system comprising:
    a plurality of mounting elements affixed to a carrier aircraft, the mounting elements being aligned with one another along a mounting axis and each mounting element being actuatable from a retention configuration to a release configuration, wherein
        (a) the retention configuration enables the mounting elements to secure the vehicle to the carrier aircraft; and
        (b) the actuation from the retention configuration to the release configuration releases the vehicle from the carrier aircraft; and
    a detent element configured to restrict movement of the vehicle rotationally about and axially along a roll axis of the vehicle with respect to the carrier aircraft when the vehicle is secured to the carrier aircraft.

2. The system of claim 1 further comprising an adaptor beam to which each mounting element is fastened and by which said affixing is achieved.

3. The system of claim 2 wherein the detent element protrudes from the adaptor beam and has an engagement portion configured to be received by a detent receptacle in the vehicle.

4. The system of claim 3 wherein the detent element is a spring-loaded pin resiliently biased to protrude from the adaptor beam.

5. The system of claim 4 wherein the detent receptacle is provided in a receptacle plate, the receptacle plate being disposed on an external mold line of the vehicle.

6. The system of claim 2, wherein the detent element is an indexing bracket on an aft end of the vehicle configured to engage a stop block element on the adaptor beam.

7. The system of claim 2, wherein the detent element is a vehicle lanyard, the vehicle lanyard having a first vehicle lanyard end connected to the vehicle and a second vehicle lanyard end connected to the adaptor beam or a said mounting element.

8. The system of claim 2, wherein the adaptor beam is configured to be mated to the carrier aircraft by way of a military store adaptor.

9. The system of claim 1, wherein said retention configuration enables the one or more mounting elements to secure the vehicle beneath the carrier aircraft.

10. A method for carrying an aerospace or launch vehicle to altitude for release to flight, the method comprising:
providing a plurality of mounting elements;
affixing the mounting elements to a carrier aircraft in alignment with one another along a mounting axis;
securing the vehicle to the carrier aircraft by way of the mounting elements;
providing a detent element configured to restrict movement of the vehicle rotationally about and axially along a roll axis of the vehicle with respect to the carrier aircraft when the vehicle is secured to the carrier aircraft;
flying the vehicle to a release altitude by way of the carrier aircraft; and
actuating the mounting elements to a release configuration so as to release the vehicle from the carrier aircraft.

11. The method of claim 10, further comprising:
attaching an adaptor beam to the carrier aircraft, wherein each mounting element is fastened to the adaptor beam and said affixing is achieved by way of the adaptor beam.

12. The method of claim 11, wherein the detent element protrudes from the adaptor beam and has an engagement portion configured to be received by a detent receptacle in the vehicle.

13. The method of claim 12, wherein the detent element is a spring-loaded pin resiliently biased to protrude from the adaptor beam.

14. The method of claim 13, wherein the detent receptacle is provided in a receptacle plate, the receptacle plate being disposed on an external mold line of the vehicle.

15. The method of claim 11, wherein the detent element is an indexing bracket on an aft end of the vehicle configured to engage a stop block element on the adaptor beam.

16. The method of claim 11, wherein the detent element is a vehicle lanyard, the vehicle lanyard having a first vehicle lanyard end connected to the vehicle and a second vehicle lanyard end connected to the adaptor beam or a said mounting element.

17. The method of claim 11, wherein the adaptor beam is configured to be mated to the carrier aircraft by way of a military store adaptor.

18. The method of claim 10, wherein said retention configuration enables the one or more mounting elements to secure the vehicle beneath the carrier aircraft.

19. A system for carrying an aeronautical or launch vehicle to altitude for release to flight, the system comprising:
one or more mounting elements affixed to a carrier aircraft along a mounting axis and being actuatable from a retention configuration to a release configuration, wherein
(a) the retention configuration enables the one or more mounting elements to secure the vehicle to the carrier aircraft; and
(b) the actuation from the retention configuration to the release configuration releases the vehicle from the carrier aircraft;
a detent element configured to restrict movement of the vehicle rotationally about and axially along a roll axis of the vehicle with respect to the carrier aircraft when the vehicle is secured to the carrier aircraft; and
an adaptor beam to which each mounting element is fastened and by which said affixing is achieved;
wherein the detent element is an indexing bracket on an aft end of the vehicle configured to engage a stop block element on the adaptor beam.

20. A method for carrying an aerospace or launch vehicle to altitude for release to flight, the method comprising:
attaching an adaptor beam to a carrier aircraft;
providing one or more mounting elements, each mounting element being fastened to the adaptor beam;
affixing the one or more mounting elements to the carrier aircraft along a mounting axis by way of the adaptor beam;
securing the vehicle to the carrier aircraft by way of the one or more mounting elements;
providing a detent element configured to restrict movement of the vehicle rotationally about and axially along a roll axis of the vehicle with respect to the carrier aircraft when the vehicle is secured to the carrier aircraft;
flying the vehicle to a release altitude by way of the carrier aircraft; and
actuating the mounting elements to a release configuration so as to release the vehicle from the carrier aircraft;
wherein the detent element is an indexing bracket on an aft end of the vehicle configured to engage a stop block element on the adaptor beam.

* * * * *